Figure 1:
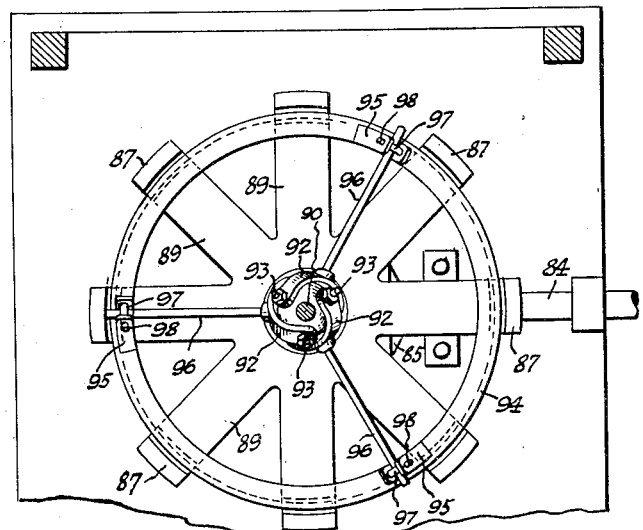

March 13, 1934.   H. E. NICHOLS   1,950,809
CONSTANT SPEED MECHANISM
Original Filed May 4, 1927

Inventor.
Horace E. Nichols,
by
Atty's

Patented Mar. 13, 1934

1,950,809

UNITED STATES PATENT OFFICE 1,950,809

CONSTANT SPEED MECHANISM

Horace E. Nichols, Detroit, Mich., assignor of one-third to Clyde Harrison Chase and one-third to Hugo A. Freund, both of Detroit, Mich.

Original application May 4, 1927, Serial No. 188,839. Divided and this application April 17, 1933, Serial No. 666,498

4 Claims. (Cl. 172—284)

The present invention relates to improvements in constant speed mechanisms, such, for instance, as may be advantageously used in connection with electrocardiographs, heliographs, heliotropes, and other types of light flashing apparatus. For instance, in an electrocardiograph a light beam is projected on a mirror and reflected through a driven slitted shutter or flasher on to a sensitized film, and a motor or other source of power is employed for revolving the apertured shutter or flasher. Such an instrument is employed for making a visible and permanent record of heart actions and consequently the speed at which the apertured shutter or flasher is revolved must be constant in order to determine time intervals throughout a diagnosis of the action of the heart. Other instances of timing may be in connection with the interruption or reflection of light beams, the operation of clock dials and time switches, and the controlling of relays and of maximum demand meters.

The driving of such shutter, for instance, from a power source and in synchronism with the latter, would be a simple matter of proper gear relationships, if the speed of the power source were assuredly constant in rate, so as to present no variation in the rate of speed. The difficulty arises because of the condition that power source operation has not reached a stage of development where the exact constancy in rate of speed is present, although the variations in rate may be small. Under most conditions of operation these minor variations become unimportant, but in structures of the type above referred to it is essential that the records obtained be accurate, and to produce this result it becomes necessary that the rate of speed of the driven element—the shutter, for instance—be constant with exactness, if possible, regardless of power variations in speed, and it is to meet this condition that the present type of invention, has been developed, it being designed to interpose, within the line from the driving structure to the driven member or element, a mechanism which will automatically detect and to compensate for the rate changes. It should be noted that the rate variations referred to are not those which come from adjustment of the power source itself—these latter are not being considered so far as the present invention is concerned; the variations referred to are those inherently present when the power source is operating at an assumed constant speed, and are variations which are small as a general rule, but which, in the production of an accurate record, for instance, would materially affect the accuracy of the record.

The present application is a division of an application filed May 4, 1927, Serial No. 188,839, patented April 18, 1933, No. 1,903,832, in which the structure herein disclosed is one of the modifications disclosed therein, the general principles underlying the solution of the particular problems involved, being capable of being employed in structures of different types, one of which is that disclosed in the present invention. The parent application discloses more particularly the detailed characteristics of the problem to be solved and the general methods employed in its solution, and this detailed explanation is not repeated herein. For the purpose of a general explanation, however, a brief synopsis of the fundamentals of the solution are presented herein, to permit a clearer understanding of the present invention and its particular manner of solving the general problems involved.

The underlying features of the general solution may be briefly stated as follows:

If the operating connections between the drive source and the driven element be of fixed character, it is evident that any variations in speed rate of the drive source are necessarily made manifest on the driven member; if the proportional speed between the two elements be amplified, any inaccuracies in the rate of the drive source will be amplified in the driven element, and vice versa. To correct this condition, this general solution of the problem contemplates the location within this line of operating connections of a mechanism which will instantly detect the presence of such variations in the rate of speed of the drive source and set in motion a change in conditions within the connections such as will so vary the operation of the connections that the rate of speed of the driven element will not be changed. In other words, no attempt is made to change the operation of the power source—the correction is made within the connections between such source and the driven element.

Fundamentally, this result is produced by placing within the line of connections a mechanism which presents the drive and driven parts as in more or less opposition and to then set up the development of a differential action characteristic between them. This may take the form of using an actual differential mechanism structure within the connections and employing a controlling mechanism for the differential on the power side of the differential, the control mechanism being operative on the differential; such structure forms the subject-matter of a companion application filed concurrently herewith, Serial No. 666,497. Or it may be in the form of a structure in which the control mechanism itself performs the function of the differential action, this particular development being found in a number of forms, one of which is disclosed and claimed in the parent application, a second form being disclosed in my companion application filed concurrently herewith, Serial No.

666,499, and a third forming the subject-matter of the present application.

Each of these involve the use of a fixed load characteristic on one side and a variable load characteristic on the opposite side of an intermediate portion of the connections, these two load conditions being effective in the operation of the control mechanism and in which the variations in speed are operative to control the variations of the variable load. These loads, in the present forms of the invention, are in the form of magnetic fields in which are mounted elements in such manner that a relative movement of the elements within the field can be had. In the fixed load condition, the element is rotative at a constant speed so that the load remains constant; in the variable load the element is movable in such manner that the number of lines of force of the field cutting the movable element are varied and thus effect the retardation value of the field on the element and consequently the load value of the field and element. The third element is a control mechanism between the two loads, and which is active in varying the variable load by the variations in speed of the drive source; this control mechanism is of various types, one of which is disclosed as a part of the present invention. This latter mechanism detects the presence of the rate changes, and by varying the variable load, produces the compensation that is necessary to preserve the constancy in the rate of speed of the driven element.

The present invention therefore consists in the improved construction and combination of parts, hereinafter described, illustrated in the accompanying drawing, and more particularly pointed out in the appended claims.

Figure 2:
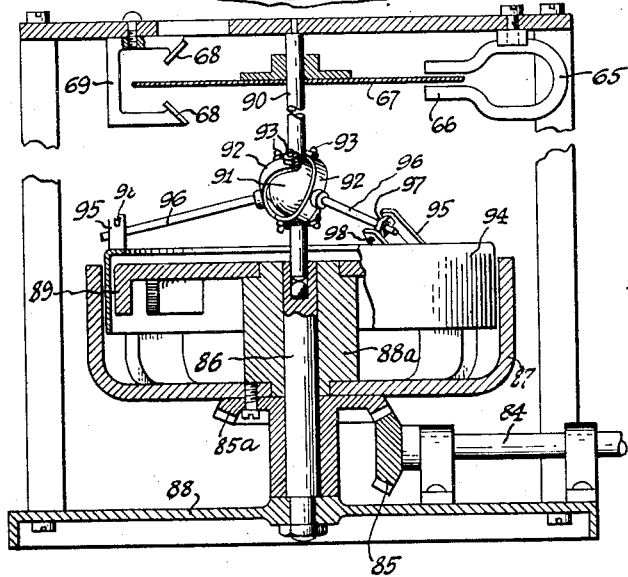

In the accompanying drawing, in which similar reference characters illustrate corresponding parts in each of the views;

Figure 1 is a top plan view, partly in section, of the particular embodiment of the invention disclosed herein, and Fig. 2 is a side elevation, partly in section of the structure of Fig. 1.

As heretofore pointed out, the present invention forms a part of the disclosure of the parent application, being disclosed therein as a modification to show an alternative form of control mechanism which can be employed in substitution for a different form of such mechanism disclosed in other forms of the parent application, in which various ways of providing the fixed load are disclosed; hence, in the parent application there was no need for disclosing any particular form of mechanism which may be operated by the shaft 90 of the present application. To complete the disclosure of the present application, therefore, there has been added, a disclosure of the mechanism of one of the other forms, for the purpose of illustrating the application of the present invention, the additional illustration taking the form of a simple fixed load structure which co-operates with the variable load to produce the characteristics of the general invention that is present in each of the forms of the parent application.

In the drawing, the shaft 84 is the drive shaft, and is shown as provided with a bevel gear 85 which is itself operatively connected to a suitable power source. A fixed bearing post 86 is secured to the base 88 and upon this post rotates a spider having equispaced arms each of which terminates in a down-turned portion, indicated as a whole as 89. A gear 85a is shown in mesh with the gear 85, and said first gear is secured to a second spider with similar equispaced arms terminating in upwardly-extending fingers, with the whole indicated as 87, these spiders are secured to each other by a connecting member 88a, the fingers of the two spiders confronting each other and forming a gap therebetween; the two spiders co-operate to produce a permanent magnet structure in which the confronting fingers provide poles to set up the conditions of a magnetic field therebetween, within which the skirt 94 of an annular member extends and is adapted to have relative movement as presently pointed out.

The upper end of shaft 90 is shown as carrying a thin disk 67, which may be an apertured shutter, and which is adapted to extend into the gap between the poles 66 of a permanent magnet structure 65, supported by a frame, and also extending into the space between the arms of a bracket 69, shown as carrying mirrors 68 adapted to direct light rays through the apertures of the shutter.

As will be understood, rotation of the shutter 67 relative to the magnet 65 takes place with the lines of force of the magnetic field active on the shutter to set up the conditions of a fixed load on the shaft 90. And it will be understood that in any position of the skirt 94 in which the latter does not extend above the lower plane of the fingers of member 89, a similar condition will be present, since the member 89 will cut the maximum number of lines of force of the field in such position; if, however, the member 94 is raised to a position where its lower edge is above the plane of the ends of the fingers of member 89, the member 94 will cut a less number of lines of force of its magnetic field, and thus reduce the resistance effect that is set up by the presence of the skirt within the magnetic field, thus presenting a structure having the characteristics of a variable load characteristic and being in contrast with the fixed load characteristic present in the shutter and magnet 65 formation.

Member 94 is carried by shaft 90, the latter being shown as supported within the upper end of shaft 86 as a convenient place of support, being mounted on a ball as a simple form of step bearing, it being understood that shaft 90 has no direct drive relation with the bearing post 86. The connections between shaft 90 and member 94, in this particular embodiment of the invention, are indicated as follows:

A ball 91 is carried by shaft 90, and this is shown as carrying a plurality of pivotally-mounted straps or members 92—three being shown—these members being pivotally supported at their ends by suitable pins 93, the pairs of the latter being arranged in such manner that the straps or members 92 can swing relative to the surface of the ball, with the axis of swinging movement at a suitable angle to the axis of shaft 90 less than a right angle, the several straps being located in spaced arrangement about the ball, with all of the straps having the same angle of swing relative to the axis of shaft 90. Each strap or member 92 carries an outwardly extending arm 96, the free ends of which extend through a member 97 which is pivotally supported between the members of a divided bracket 95, which extend upwardly at an angle from member 94, a suitable form of pivot mounting (indicated at 98) being employed for the mounting of member 97.

As will be understood, with the parts at rest, member 94 will be in its lower position, the weight of member 94 causing it to assume such position. If, however, gear 85 be rotated in a clockwise direction in Fig. 1, it will move the lower permanent magnet structure in similar direction, such movement, in turn, tending to carry member 94 with it due to the magnetic field conditions that are present. Such movement of member 94 would, through the connections shown, rotate shaft 90 in the same direction, the speed of rotation of the latter, in the absence of any resistance or load, approaching the speed of the lower magnet structure. However, the presence of the fixed load condition in connection with shaft 90, provides a resistance to movement of the shaft, the result being that the advancing movement of member 94 begins to move the straps 92 on their pivots to swing the arms 96—the resistance to this movement being less than that of the fixed load—with the result that arms 96 raise and carry with them member 94, moving the latter upwardly and in a direction to tend to carry it out of the magnetic field of the lower magnet system. Obviously, as the member 94 is raised the number of lines of force cut by it are decreased in number with the result that the power drag applied by the lower magnet structure decreases in value, thus exercising less power effect on the shaft 90. This, in turn, places the weight of member 94 and the connections as an active factor tending to lower this member and thereby increase the drag effect by increasing the number of lines of force cut by the member within the magnetic field.

As will be understood, the lower magnet system is of greater power than the upper system, as long as the member 94 is partially within the field, and when the member is in its lower position the superiority of power provides the necessary drag effect to force the parts to rotate, the shaft 90 being driven at a speed such as to make its load resistance effective, and thus move the member 94 in its upward direction until a point is reached where the relative action of the upper magnet system and the weight of member 94 locates the skirt of member 94 at the proper height within the lower magnet system so as to cause the desired amount of drag on member 94 to rotate shaft 90 at the desired speed, this being fixed by the weight of the member and the load value of the upper magnet system.

When this balanced condition is obtained, the structure is ready to perform its functions. As long as the lower magnet structure rotates at an exactly uniform rate of speed, the parts will continue to operate in these positions. Should, however, the power rate of speed increase such change will be made manifest immediately through the increase in speed of member 94, thus disturbing the previous conditions, with the result that the advance of said member will raise it slightly to decrease the power of the field on said member 94, so that the speed of travel of the member is slightly decreased, a new position of balance of member 94 being presented and which retains the prior speed of the shaft 90. Should the variation in speed of the power source being in a decreased rate, however, the decrease in speed of the lower magnetic field structure will cause the weight of member 94 to become effective with its tendency to lower the member, thus increasing the drag power of the lower magnet system to cause member 94 to travel at a higher speed, the arrangement of the parts being such that the changes made in this manner are compensatory and operative to retain the speed of shaft 90 constant. The parts are so arranged that at the desired speed of shaft 90 and the proper speed of the power source, the skirt of member 94 is at an intermediate position of the magnetic field, so that its movements above and below such position are effective in controlling the value of the drag effect of the lower magnet structure.

While I have herein shown and described a particular way in which the general principles of the invention can be carried into effect, it will be readily understood that variations and modifications therein may be found necessary or desirable to meet the various exigencies of use, and I therefore reserve the right to make any and all such changes as may be found necessary or desirable insofar as the same may fall within the spirit and scope of the invention as expressed in the accompanying claims, when broadly construed.

Having thus described my invention, what I claim as new is:—

1. In timing mechanism wherein the speed of a driven shaft is adapted to be maintained constant regardless of speed changes of the drive shaft, a driven shaft having a load of constant value to produce a torque reaction constant in value, a drive shaft, and means responsive to drive speeds of the drive shaft for automatically producing an independent torque reaction within the means with the value of the latter torque reaction determined by the speed of the drive shaft and variable in presence of drive speed variations with such torque reaction variations compensatory to the speed variations, said means including a load for producing the torque reaction and variable as to value by the variations in drive speed, the respective loads each including a member and a magnetic field movable relatively to each other, the member for the variable torque reaction being supported by a plurality of pivoted arms with the pivot axis of an arm inclined to the axis of rotation of the member and to a plane normal to the latter axis.

2. Mechanism as in claim 1 characterized in that the several arms are equi-spaced relative to the member with the angle of inclination of the pivot of each arm at similar angle with respect to the member axis of rotation.

3. Mechanism as in claim 1 characterized that the support for the arms includes an element in axial alinement with the axis of rotation of the member, the arm pivots being carried by the element with the angle of inclination of the pivot of each arm similar relative to the axis of the element.

4. In timing mechanism wherein the speed of a driven shaft is adapted to be maintained constant regardless of speed changes of the drive shaft, a driven shaft having a load of constant value to produce a torque reaction constant in value, a drive shaft, and means responsive to drive shaft movements for producing an independent torque reaction variable as to value in response to variations in speed of the drive shaft, said means including a magnetic field movable with the drive shaft, an annular member carried by and movable with the driven shaft and extending within the magnetic field, and supporting means for the annular member, said supporting means including a plurality of arms carried by the driven shaft with each arm pivotally mounted on an axis inclined to the drive shaft axis and to a plane normal to such axis.

HORACE E. NICHOLS.